(No Model.) 2 Sheets—Sheet 1.

R. G. G. MOLDENKE.
APPARATUS FOR MELTING METALS.

No. 569,221. Patented Oct. 13, 1896.

Witnesses
C. W. Kury
Richard S. Elliott

Richard G. G. Moldenke, Inventor
By Schreiter & Van Iderstine
Attorneys.

(No Model.) 2 Sheets—Sheet 2.

R. G. G. MOLDENKE.
APPARATUS FOR MELTING METALS.

No. 569,221. Patented Oct. 13, 1896.

UNITED STATES PATENT OFFICE.

RICHARD G. G. MOLDENKE, OF PITTSBURG, PENNSYLVANIA.

APPARATUS FOR MELTING METALS.

SPECIFICATION forming part of Letters Patent No. 569,221, dated October 13, 1896.

Application filed May 18, 1896. Serial No. 591,986. (No model.)

*To all whom it may concern:*

Be it known that I, RICHARD G. G. MOLDENKE, a citizen of the United States, and a resident of Pittsburg, county of Allegheny, and State of Pennsylvania, have invented certain new and useful Improvements in Apparatus for Melting Metals, of which the following is a full, clear, and exact specification, reference being had to the accompanying drawings, wherein—

Figure 2:
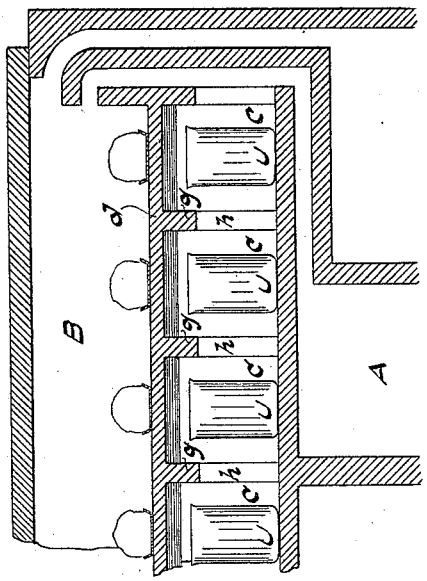
Figure 3:
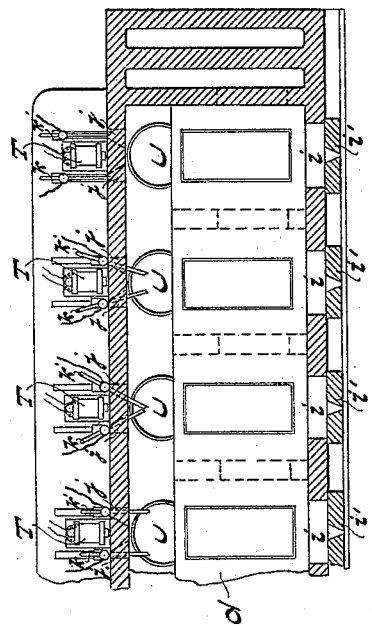
Figure 1:
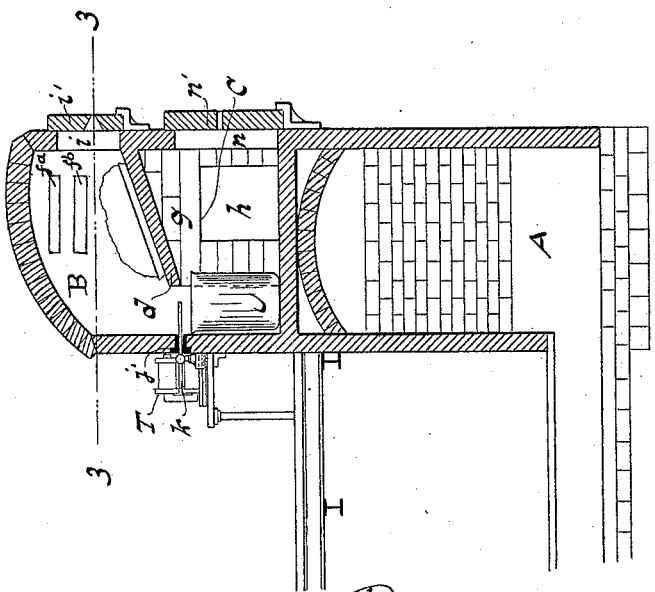
Figure 4:
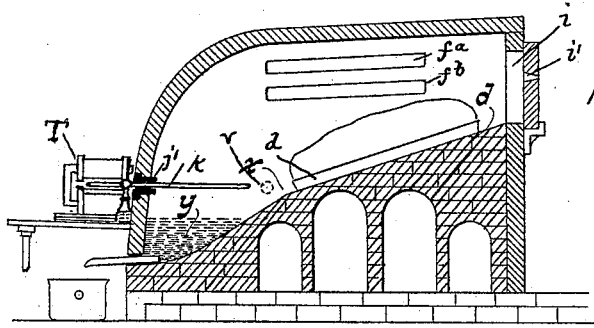
Figure 5:
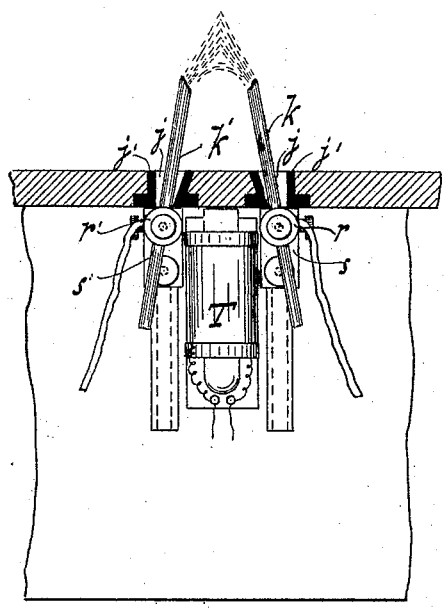
Figure 6:
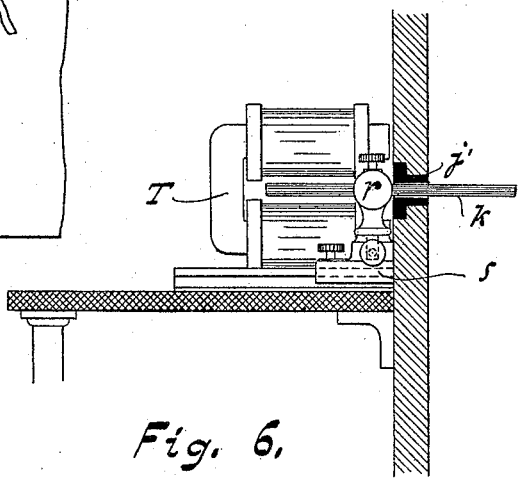

Figure 1 is a transverse section of my improved crucible-furnace provided with my electric melting apparatus; Fig. 2, a longitudinal section thereof. Fig. 3 is a horizontal section on line 3 3 in Fig. 1. Fig. 4 is a cross-section of a modified construction of my improved furnace. Fig. 5 is an enlarged detail, a top view of the electric melting apparatus. Fig. 6 is a side elevation thereof.

My invention relates to metallurgy; and it consists of the hereinafter-described apparatus for melting of metals by the combined action of furnace and electrical heat, whereby chemical changes in the composition and in the substance of the metal melted and the consequent loss of their ingredients are avoided.

It is well known in the arts that the substance and also the chemical composition of metals and metallic alloys are considerably changed in every metallurgical process. The losses in quantity and also in quality resulting therefrom are the greater the longer the metals treated are kept subjected to heat near their melting-point, and consequently in composition of the charges due allowance must be always made for these changes according to the process. These changes are detrimental to the metals treated, especially to steel, detracting from their valuable qualities. Mainly for this reason it was undertaken to adapt the very expensive electric process in metallurgical treatment of steel and some other metals, in order to diminish the extent of such changes by quickening the process. The scope of application of the electric process is, however, necessarily limited for several reasons, mainly on account of its being much more costly (in proportion to other processes) and also because the process requiring the keeping of carbon electrodes for a longer time in contact with the charge will also produce a change in the substance and composition of the metal, a considerable quantity thereof being absorbed in forming carbids.

I have devised an apparatus for treating metals and metallic alloys wherein I combine the economical advantages of the crucible-furnace with those of the electric process, the metal to be treated being heated up to near its melting-point in a crucible-furnace—there is practically no change either in the substance or composition of the metal up to this point—and is then subjected to the action of an electric arc, melting it rapidly, the flow of the melted metal being then immediately diverted into a crucible. The metal thus treated undergoes practically no change whatever.

The furnace adapted for my improved melting process is illustrated in the accompanying drawings, and comprises mainly a combustion or regenerator chamber A and a heating or melting chamber B, this latter being provided with a sloping platform $d$, supported on arches $g$, arranged therein.

The combustion or regenerator chamber may be of any approved construction. The one shown in the drawings is modeled after the Siemens regenerator. The upper part, the heating-chamber, is divided underneath the sloping platform $d$ by cross-walls $g$ into a number of chambers C, having apertures $n$, through which the crucibles are set in and removed, and communicating with each other through passages $h$, provided in the cross-walls. Above each of these chambers C and above the sloping platform $d$ is provided a charging-aperture $i$, normally covered by a door. Platform $d$ is joined to the rear wall of the furnace and extends about three-fourths of the width and the whole length of chamber B. The platform slopes from the rear toward the front wall of the furnace, the incline being sufficient to make a charge deposited thereon slide slowly toward the open space between the edge of the platform and the opposite (front) wall of the furnace.

Apertures $i$ and $n$ for charging the furnace and also for setting in and removing the crucible, provided in the rear wall of the furnace, are closed by suitably-constructed sliding doors $i'$ and $n'$, respectively.

Opposite the sloped platform are provided in the front wall of the furnace suitable apertures *j* for carbon electrodes *k* and *k'*. These apertures are lined with insulating material and so constructed that the carbon electrodes *k* and *k'* inserted through them may be moved within the furnace together and apart again as may be necessary to form an arc.

Outside of the furnace on a stoop or shelf are arranged the apparatuses for applying the electric current to the charge at the moment the same reaches the edge of platform *d*.

The apparatuses are mounted on insulating-plates and consist of holders *r* and *r'* for the carbon electrodes, mounted on sliding sockets *s* and *s'*, and of the powerful horseshoe electromagnet T, set between the carbon-holders on a separate insulating-plate. The electromagnet is energized by the same electric current passing through the carbon electrodes but separately conducted from the one used in producing the arc. The sliding sockets are provided to facilitate the withdrawing of the carbons from the furnace and closing the holes by bricks when the apparatus in any one particular section is not in operation.

The electromagnet is used for deflecting the arc so as to turn its vertex in proximity to the edge of the platform *d*, thus reaching therewith the charge at the moment of its reaching this edge. Normally the carbons are withdrawn from the furnace, their ends resting in the insulating-rings *j'*, set in the holes of the wall, and the heat maintained within the furnace is near the melting-point of the charged material.

The melting operation goes on as follows: The charges to be melted are filled into the furnace through the charging-apertures. When the charge is thoroughly and about sufficiently heated, the pan carrying the charge (which is preferably made of the same material and also melted with it) is pushed to give it a start in the slide toward the edge of the platform *d*. The carbon electrodes *k* and *k'* are then run in into the furnace and the electric current turned on. At the same time the electromagnet T is energized and the carbons, which first were turned with their points close together, are gradually separated to elongate the arc, the electromagnet blowing it pointedly, like a reducing-flame, toward the edge of the wall *d* and into the charge.

The charged material melts while passing through the arc and flows into the crucibles U, set underneath. If any material should drop from the edge of the platform *d* into the crucible without being melted, it will speedily be melted in the crucible itself by the heat deflecting from the arc above. When the whole charge is melted, the electric current is turned off and the carbons withdrawn from the furnace. At the same time the crucibles U are removed through the lower doors *n'* in the rear wall of the furnace.

The working of the furnace can be arranged in rotation, the charges being melted successively one after another and replaced by new when melted. In this manner the economical working of the process and apparatus may be yet improved in the point of saving on material, fuel, time, labor, and electricity.

My improved process is especially applicable for working of small charges, such as are ordinarily required for small castings. It will also be found very useful for melting and casting into ingots of scrap of brass, bronze, &c, and of such other metallic alloys, consisting of metals having different melting-points, which cannot for this reason be melted in crucibles without wasting (burning out) of the ingredients having a lower melting-point.

For casting of steel, the scrap-steel, together with the necessary ferrosilicon or ferromanganese, or just scrap containing the necessary quota of silicon and manganese, are placed in a small pan or boat stamped of a sheet produced of similar material and so charged into the furnace.

A great advantage of my improved apparatus is that scrap without any other addition can be worked therein, as there is no loss of any of its ingredients. In this manner castings of steel can be produced without the expensive additions to the charge otherwise necessary in the processes heretofore known.

My improved apparatus for melting metals will also be found adaptable for continuous working by substituting a hearth for the crucible. This can be done by changing the construction of the furnace accordingly. Such a furnace, adaptable for this process, is shown in Fig. 4 in section. The material is charged (deposited) on the sloping plane *d*, and while it gradually slides downward toward the edge *x* is heated nearly to the melting-point. On reaching the edge the material passes into the electric arc, whose vertex is indicated by the circle shown in broken lines in Fig. 4 and designated by the letter *v*. The arc is produced and directed in the same manner as above described, and the melted material flows then into the hearth *y*, which is tapped at convenient intervals. The melted material accumulated in the hearth is discharged in the usual manner therefrom. The flues $f^a$ and $f^b$ conduct the air and gas, respectively, into the furnace for heating the charge on the sloped platform *d*, the same as in the crucible-furnace described above. This modified apparatus is adapted for working larger heats.

I claim as my invention and desire to secure by Letters Patent—

In an apparatus for melting of metals, the combination with a crucible-furnace, having a sloped platform for the charge and means for heating the charge up to (or near) its melting-point, of an electric apparatus, comprising two carbon electrodes, set in sliding sockets, funnel-shaped holes in the wall of the furnace, and a horseshoe electromagnet, set between the carbon electrodes, the carbon electrodes being inserted into the furnace through the funnel-shaped holes in this wall, and adapted to produce therein an electric arc, and the electromagnet blowing the vertex of the arc toward the charge in the furnace.

In witness that I claim the improvements described in the foregoing specification I have signed my name in the presence of two subscribing witnesses.

RICHARD G. G. MOLDENKE.

Witnesses:
ALBERT J. G. PECHSTEIN,
GEORGE T. WHITE.